United States Patent [19]
Orlicki et al.

[11] Patent Number: 5,461,484
[45] Date of Patent: Oct. 24, 1995

[54] SINGLE CHANNEL ENCODER FOR RASTER PIXEL CLOCK

[75] Inventors: David M. Orlicki; James A. Larrabee, both of Rochester, N.Y.

[73] Assignee: Eastman Kodak Company, Rochester, N.Y.

[21] Appl. No.: 76,226

[22] Filed: Jun. 14, 1993

[51] Int. Cl.$^6$ .................................................... H04N 1/21
[52] U.S. Cl. ............................................. 358/296; 347/249
[58] Field of Search ............................ 347/248, 249, 347/250, 229; 358/296, 300, 302; 346/134, 136

[56] References Cited

U.S. PATENT DOCUMENTS

| 4,155,103 | 5/1979 | Gamblin et al. . | |
|---|---|---|---|
| 4,232,342 | 11/1980 | Skala . | |
| 4,279,002 | 7/1981 | Rider . | |
| 4,295,167 | 10/1981 | Wiggins | 358/412 |
| 4,706,130 | 11/1987 | Yamakawa | 358/296 |
| 4,858,019 | 8/1989 | Ohara et al. . | |
| 4,942,478 | 7/1990 | Yamagishi et al. . | |
| 5,014,137 | 5/1991 | Shimada . | |
| 5,043,744 | 8/1991 | Fantuzzo et al. . | |

*Primary Examiner*—Mark J. Reinhart
*Attorney, Agent, or Firm*—Robert L. Randall

[57] ABSTRACT

A reliable, low cost system for generating precisely aligned pixel clock and index signals for a digital scanning or printing system is based on a novel single channel encoder pattern detected with a single sensor. The signal output of the sensor representing the encoder pattern is processed with phase locked loop based circuit to generate pixel clock and index signals of known and guaranteed phase.

8 Claims, 4 Drawing Sheets

ENCODER TRACK

ENCODER SIGNAL

PLL FDBK

PIXEL CLK

SINGLE CHANNEL ENCODER FOR RASTER PIXEL CLOCK

FIELD OF THE INVENTION

The invention relates in general to the field of electronic printing of photographic images. More specifically, the invention relates to encoders and pixel clock circuits that control the timing of line writing operations in electronic photographic printers.

BACKGROUND OF THE INVENTION

Photographic printing of digitized images is accomplished by modulating the intensity of a light beam as the beam moves relative to a photosensitive media. The most common motion pattern has the beam move rapidly along a single line as a single row of pixels is modulated or "clocked out" starting from a fixed margin location. The beam is then indexed to the next line of the page and returned to the margin before writing the next row of pixels.

A high degree of precision is required in identifying the margin location and pixel boundaries since misalignment of the pixels by as little as ten percent of a single pixel width degrades the perceptible quality of the printed image. Conventional printers have employed a two channel position encoding scheme to prevent misalignment. One channel of relatively high resolution is used to generate a pixel clock while a second channel generates one index pulse per revolution at a fixed position relative to signal line start. Synchronization of the pixel clock and the index to assure line to line uniformity is not an easy matter, and systems employ precise alignment of the two encoder channels and associated sensors to insure non-coincidence of pixel clock and line start signal transitions.

In view of the above, it is an object of the invention to provide a reliable low cost means for generating precisely aligned pixel clock and index signals for a digital scanning or printing system.

SUMMARY OF THE INVENTION

The invention provides a reliable, low cost system for generating precisely aligned pixel clock and index signals for a digital scanning or printing system. The system is based on a novel single channel encoder pattern detected with a single sensor. The signal output of the sensor representing the encoder pattern is processed with phase locked loop based circuit to generate pixel clock and index signals of known and guaranteed phase.

Specifically, an encoder track having M total cycles is provided, wherein M-1 cycles of the encoder track have a duty ratio less than 50 percent and one cycle of the encoder track has a duty ratio greater than 50 percent. The encoder track is read by a sensor that generates an encoder signal that is supplied to a pixel clock circuit. The pixel clock circuit includes a phase lock loop circuit having an encoder signal input, a feedback signal input, and a pixel clock output coupled to an input of a divider circuit, wherein the divider circuit generates a feedback output signal that is supplied to the feedback signal input of the phase lock loop circuit. A flip-flop is used to generate an index signal in response to the encoder signal generated by the sensor and the feedback signal generated by the divider.

BRIEF DESCRIPTION OF THE DRAWINGS

Reference should now be made to the following detailed description of the preferred embodiments of the invention and the accompanying drawings, wherein.

DESCRIPTION OF THE INVENTION

Figure 1:
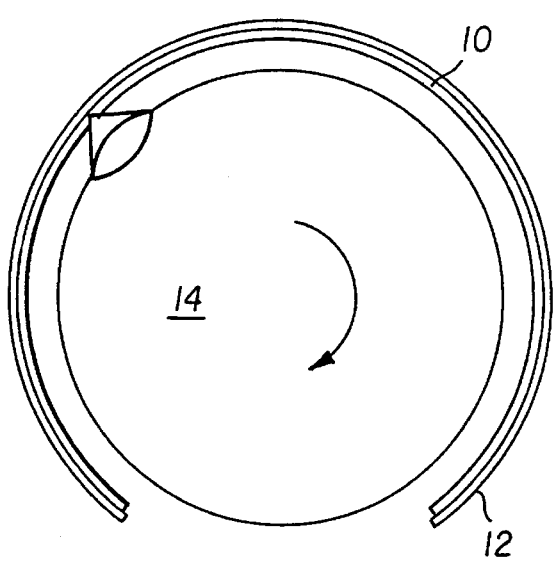
FIG. 1 is a schematic representation of a side view of a print engine.

A side view of a print engine is schematically represented in FIG. 1. Photographic media 10 is supported as on the inner surface of a write media support cylinder 12, such that a write beam emitted from a rotating print drum 14 and modulated so as to represent information stored in successive pixels, writes a single image line on the photographic media 10 for each revolution of the rotating print drum 14. The print drum 14 is advanced one pixel width through the write support cylinder 12 for each revolution, so that the next line of pixels writes to the adjacent physical line on the photographic media 10.

Figure 2:
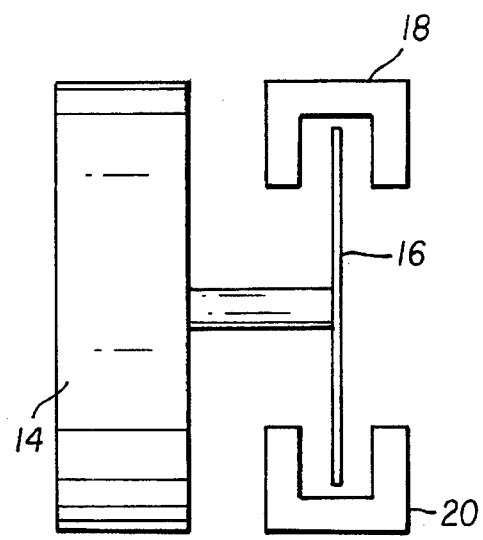
FIG. 2 is a schematic representation of a encoder wheel assembly attached to a rotating drum of the print engine shown in FIG. 1.

Referring now to FIG. 2, the print drum 14 is attached to an encoder assembly that includes an encoder wheel 16, a motion encoder sensor 18 and a line start index sensor 20. The motion encoder sensor 18 is used to generate a multiple pulse per revolution encoder signal, based on an encoder track located on the encoder wheel 16, which is used to measure the location of the print drum 14. The line start index sensor 20 generates a single output per line index signal, based on an index track located on the encoder wheel 16, which is used to identify the image margin location. The line start index sensor 20 is usually mounted in the same assembly as the motion encoder sensor 18, as shown in FIG. 2, although other physical embodiments are sometimes employed.

Figure 3:
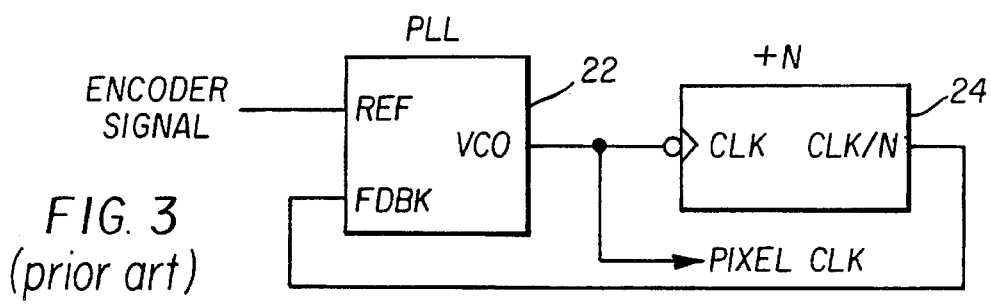
FIG. 3 illustrates a phase-lock-loop pixel clock generating circuit employing a voltage controlled oscillator and a divider.
Figure 4:
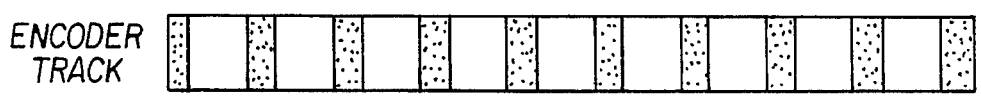
FIG. 4 illustrates the relationships among the physical encoder track, the PLL clock circuit signals and a generated pixel clock.
Figure 4:
Figure 4:
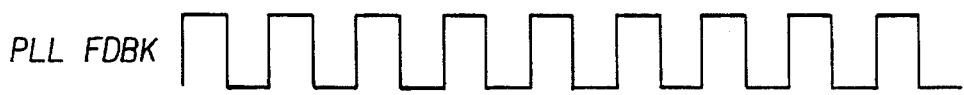
Figure 4:
Figure 5:
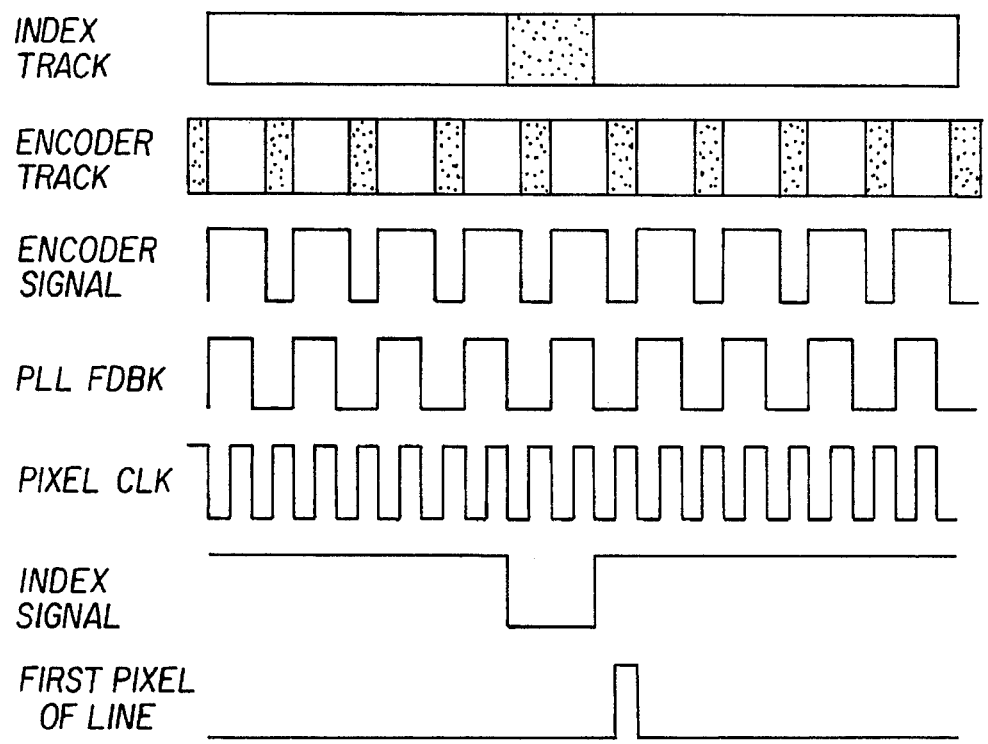
FIG. 5 illustrates the relationship between the generated pixel clock and an index pulse generated by the line start sensor shown in FIG. 2.

In order to reduce the line count (lines per revolution) required for the encoder assembly, phase locked loop (PLL) multiplication of the encoder output frequency is commonly employed in the art. A pixel clock circuit employing a phase lock loop (PLL) circuit 22 with an internal voltage controlled oscillator (not shown) and a divider 24 is illustrated in FIG. 3. The relationships among the physical encoder track, the pixel clock circuit signals and the generated pixel clock are displayed in FIG. 4. The duty cycle of the encoder output is arbitrary in general since the PLL is responsive only to rising edges The action of the PLL pixel clock circuit is to drive the output (VCO) of the internal voltage controlled oscillator such that the divided down output pulse train (FDBK) contains coincident rising edges in one to one correspondence with those of the encoder signal. It should be noted that since the divider 24 is falling edge triggered, the recovered pixel clock contains falling edges coincident with encoder signal rising edges at a frequency N times that of the encoder. The relationship between the generated pixel clock and an index pulse generated by the line start sensor 20 is shown in FIG. 5. The first rising edge in the pixel clock stream that occurs after the rising edge of the index signal is preferably chosen to clock out the first pixel of the line.

Figure 6:
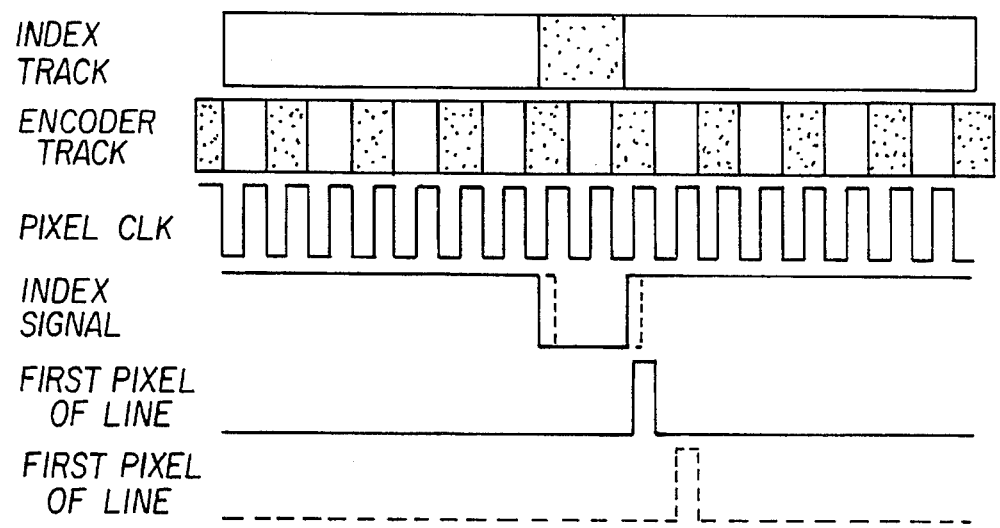
FIG. 6 illustrates the impact of small variations in index signal timing relative to the pixel clock.
Figure 7:
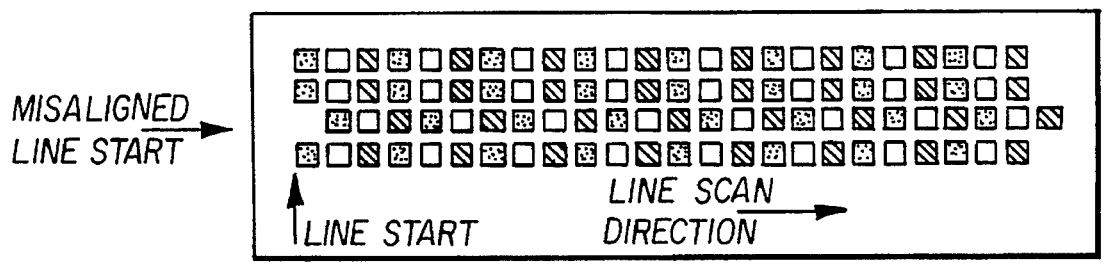
FIG. 7 illustrates the displacement of all pixels in a line due to the misplacement of the first pixel relative to previous lines.

The impact of small variations in index signal timing relative to the pixel clock is displayed in FIG. 6. If the rising edges of index signal and pixel clock are coincident, ambiguity exists in the choice of pixel clock interval for the first pixel of the line. Near the point of coincidence of these signals, extremely small variations in index signal or pixel clock location can result in full pixel width line displacement. If the first pixel is misplaced relative to previous lines, all succeeding pixels in that line will be displaced correspondingly as is illustrated in FIG. 7.

Figure 8:
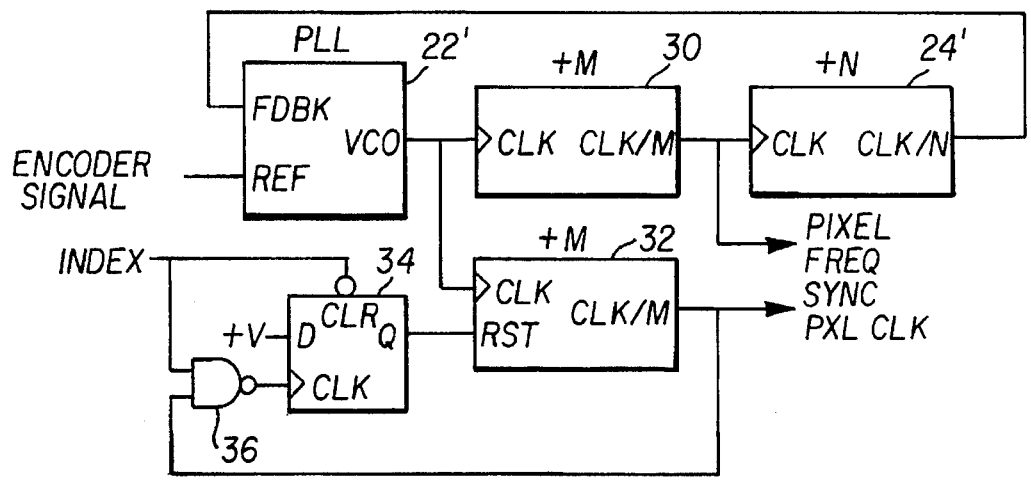
FIG. 8 is a schematic diagram of a pixel clock circuit in accordance with the invention.

Referring now to FIG. 8, a pixel clock circuit in accordance with the invention is shown which, in conjunction with a modified encoder track, eliminates index pulse placement ambiguity. As in the circuit illustrated in FIG. 4, the pixel clock is generated via PLL multiplication of the encoder signal by means responsive to the rising edge of the encoder signal only. In the previous case, the duty cycle of the encoder track signal was irrelevant. Now, however, the track is configured such that M-1 cycles of the track have duty ratio less than 50 percent while one cycle has duty ratio greater than 50 percent, where there are M total cycles on the encoder track.

Figure 9:
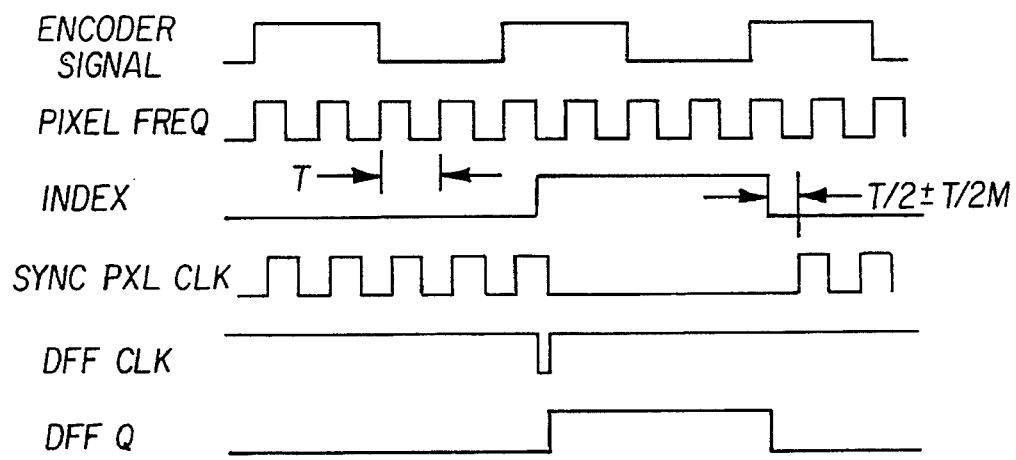
FIG. 9 illustrates the relationship between the modified encoder track and the signals generated by the clock circuit.

The value of the encoder signal is stored in a flip flop 26 on falling edges of the FDBK signal which, by using the appropriate choice of circuitry in the divider 24' and the rising edge synchronizing nature of the PLL, are made to occur precisely midway between rising edges of the encoder signal. The resulting unitrack index signal is generated once per revolution and changes state only on falling edges of the pixel clock. The pixel clock signal (PIXEL CLK) is generated based only on rising edge information of the encoder signal, independent of encoder signal falling edges. The unitrack index signal is generated based only on falling edge information in the encoder signal as long as the encoder signal rising edges are sufficiently uniformly spaced to maintain proper operation of the PLL. Such uniformity is easily maintained through standard manufacturing techniques applied to the encoder pattern in conjunction with the uniform rotational speed of the drum otherwise required to maintain consistent image quality. The relationship between the modified encoder track and the signals generated by the clock circuit are shown in FIG. 9.

Figure 10:
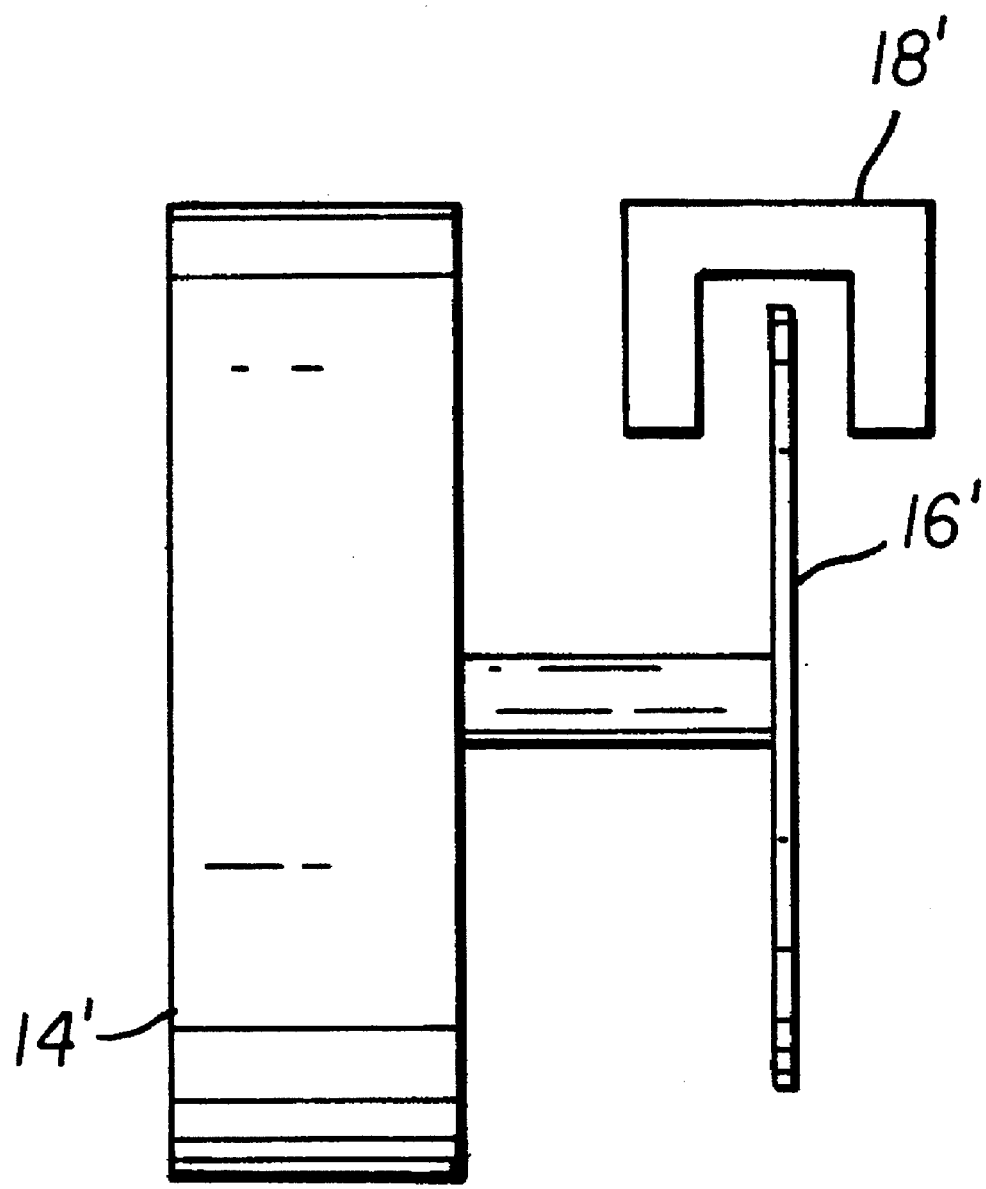
FIG. 10 illustrates an encoder assembly in accordance with the invention that utilizes a single encoder sensor and an encoder wheel with the modified encoder track illustrated in FIG. 9.

The use of the modified encoder track and the pixel clock circuit of FIG. 8 eliminates the need for a separate line start index sensor. Thus, the encoder assembly for the print engine can be simplified by using a single encoder sensor 18' to read the modified encoder track which is placed on the encoder wheel 16' as shown in FIG. 10.

The invention has been described with reference to certain preferred embodiments thereof, it will be understood, however, that modifications and variations are possible within the scope of the appended claims. For example, circuit elements other than the flip-flop 26 can be used to store the encoder signal.

PARTS LIST

10 PHOTOGRAPHIC MEDIA
12 WRITE MEDIA SUPPORT CYLINDER
14 ROTATING PRINT DRUM
14' ROTATING PRINT DRUM
16 ENCODER WHEEL
16' ENCODER WHEEL
18 MOTION ENCODER SENSOR
18' MOTION ENCODER SENSOR
20 LINE START INDEX SENSOR
22 PHASE LOCK LOOP (PLL) CIRCUIT
24 DIVIDER
26 FLIP FLOP

What is claimed is:

1. An apparatus comprising: an encoder track having M total cycles, wherein M-1 cycles of the encoder track have a duty ratio less than 50 percent and one cycle of the encoder track has a duty ratio greater than 50 percent; sensor means for sensing the encoder track and generating an encoder signal; circuit means for receiving the encoder signal from the sensor means and generating a pixel clock signal and an index signal.

2. An apparatus as claimed in claim 1, wherein the circuit means generates one index signal for each complete sensing of M total cycles of the encoder track by the sensor means.

3. An apparatus comprising: an encoder track having M total cycles, wherein M-1 cycles of the encoder track have a duty ratio less than 50 percent and one cycle of the encoder track has a duty ratio greater than 50 percent; a pixel clock circuit comprising a phase lock loop circuit including an encoder signal input, a feedback signal input, and a pixel clock output coupled to an input of a divider circuit, wherein the divider circuit generates a feedback output signal that is supplied to the feedback signal input of the phase lock loop circuit; sensor means for reading the encoder track and supplying an encoder signal to the encoder signal input of the phase lock loop circuit; means for generating an index signal in response to encoder signal generated by the sensor means and the feedback signal generated by the divider circuit.

4. An apparatus as claimed in claim 3, wherein the means for generating an index signal includes a flip flop circuit.

5. An electronic printing apparatus comprising:
a write media support cylinder; a rotatable print drum located within the write cylinder; and an encoder assembly coupled to the rotatable print drum; wherein the encoder assembly comprises an encoder wheel, including an encoder track having M total cycles where M-1 cycles of the encoder track have a duty ratio less than 50 percent and one cycle of the encoder track has a duty ratio greater than 50 percent; sensor means for sensing the encoder track and generating an encoder signal; circuit means for receiving the encoder signal from the sensor means and generating a pixel clock signal and an index signal.

6. An apparatus as claimed in claim 5, wherein the circuit means generates one index signal for each complete sensing of M total cycles of the encoder track by the sensor means.

7. An electronic printing apparatus comprising:

a write media support cylinder; a rotatable print drum located within the write cylinder; and an encoder assembly coupled to the rotatable print drum; wherein the encoder assembly comprises an encoder wheel, including an encoder track having M total cycles where M-1 cycles of the encoder track have a duty ratio less than 50 percent and one cycle of the encoder track has a duty ratio greater than 50 percent; a pixel clock circuit, comprising a phase lock loop circuit including an encoder signal input, a feedback signal input, and a pixel clock output coupled to an input of a divider circuit, wherein the divider circuit generates a feedback output signal that is supplied to the feedback signal input of the phase lock loop circuit; sensor means for leading the encoder track and supplying an encoder signal to the encoder signal input of the phase lock loop circuit; and means for generating an index signal in response to encoder signal generated by the sensor means and the feedback signal generated by the divider circuit.

8. An apparatus as claimed in claim 7, wherein the means for generating an index signal includes a flip flop circuit.

* * * * *